(12) United States Patent
Colic et al.

(10) Patent No.: US 7,165,327 B2
(45) Date of Patent: Jan. 23, 2007

(54) METHOD FOR INSTALLING A VALVE MEMBER IN AN AUXILIARY CONTROL VALVE DEVICE

(75) Inventors: Rajko Colic, Bad Homburg (DE); Thomas Mann, Nidderau-Windecken (DE)

(73) Assignee: Siemens AG, München (DE)

( * ) Notice: Subject to any disclaimer, the term of this patent is extended or adjusted under 35 U.S.C. 154(b) by 258 days.

(21) Appl. No.: 10/514,117

(22) PCT Filed: Jun. 17, 2004

(86) PCT No.: PCT/EP2004/051151

§ 371 (c)(1),
(2), (4) Date: Nov. 12, 2004

(87) PCT Pub. No.: WO2005/012710

PCT Pub. Date: Feb. 10, 2005

(65) Prior Publication Data
US 2006/0059685 A1    Mar. 23, 2006

(30) Foreign Application Priority Data
Jul. 31, 2003    (DE) ................ 103 35 121

(51) Int. Cl.
*B23P 11/00*    (2006.01)

(52) U.S. Cl. .............. 29/890.124; 29/888.46; 123/184.53; 137/15.18; 251/322

(58) Field of Classification Search ............ 29/888.46, 29/890.124; 123/184.53–184.56; 137/15.18, 137/15.24; 251/320–323, 129.01

See application file for complete search history.

(56) References Cited

U.S. PATENT DOCUMENTS 3,119,405 A    1/1964   Guy
4,142,707 A  * 3/1979   Bjorklund ................... 251/77

(Continued)

FOREIGN PATENT DOCUMENTS

DE    101 37 828 A1    2/2003

(Continued)

OTHER PUBLICATIONS

Derwent-Abstract—FR 2714114; Jun. 23, 1995; Regie Nationale des Unsines Renault S.A.; France.

(Continued)

*Primary Examiner*—S. Thomas Hughes
(74) *Attorney, Agent, or Firm*—Siemens AG

(57) ABSTRACT

A method for arranging a valve element in an additional control valve device includes provides that, after a first position has been set, a valve plate is pushed onto the stem until the valve plate contacts the stop of a trapping magnet. The valve plate is then connected to the stem. This ensures that the fabrication tolerances are completely compensated by virtue of the first valve spring and the guiding of the valve element. After the second counter bearing has been secured in the guide, the holding of the first counter bearing in the previously determined first position is cancelled, which is then generally carried out by removing the tappet from the guide. After this has been done, the valve element automatically assumes a central position between the gantry magnet and the trapping magnet in the currentless state of the additional control valve device owing to the spring forces which then act.

4 Claims, 7 Drawing Sheets

U.S. PATENT DOCUMENTS

| | | | |
|---|---|---|---|
| 4,412,517 | A | 11/1983 | Kobashi et al. |
| 5,584,270 | A | 12/1996 | Dohring |
| 6,913,241 | B2 * | 7/2005 | Bernarding et al. ... 251/129.12 |
| 6,969,048 | B2 * | 11/2005 | Colic et al. ................. 251/357 |
| 2003/0024502 | A1 | 2/2003 | Kreuter |
| 2005/0151108 | A1 * | 7/2005 | Colic et al. ................. 251/356 |
| 2005/0205828 | A1 * | 9/2005 | Schroeder ................... 251/359 |

FOREIGN PATENT DOCUMENTS

| | | |
|---|---|---|
| DE | 102 13 487 A1 | 4/2003 |
| EP | 1323968 * | 7/2003 |
| FR | 2 714 114 | 6/1995 |
| WO | WO 2005/012773 * | 2/2005 |

OTHER PUBLICATIONS

Derwent-Abstract—DE 101 37 828A1; Feb. 20, 2003; Meta Motoren- und Energietechnik GmbH, D-52134 Herzogenrath, Germany.

Derwent-Abstract—DE 102 13 487A1; Apr. 3, 2003; Mitsubishi Denki K.K., JP-Tokio, Japan.

* cited by examiner

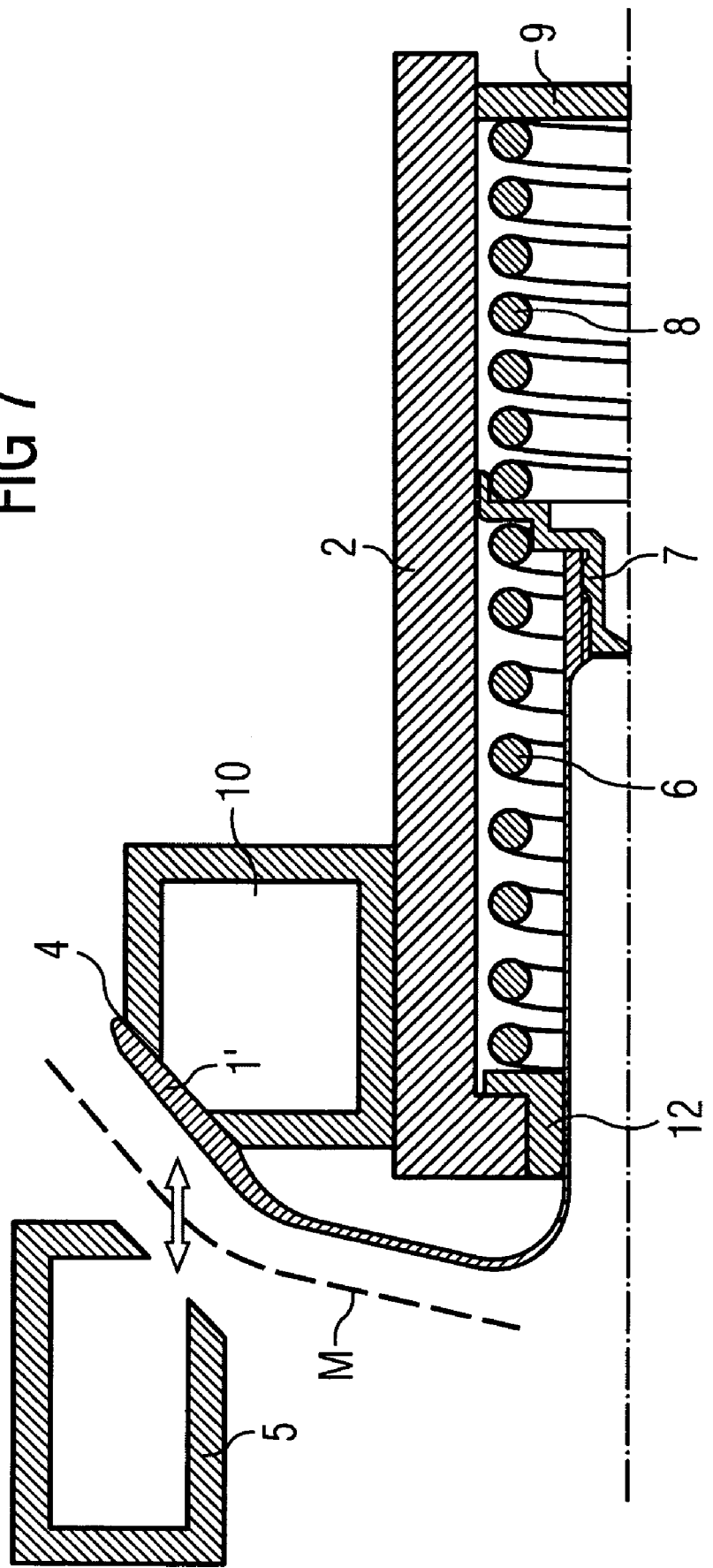

METHOD FOR INSTALLING A VALVE MEMBER IN AN AUXILIARY CONTROL VALVE DEVICE

CROSS REFERENCE TO RELATED APPLICATIONS

The present application is a national stage application of international application PCT/EP2004/051151, filed on Jun. 17, 2004, which designated the United States and was pending at the time of designation and the filing of the present application; and further claims priority to German patent application 10335121.3, filed Jul. 31, 2003; the both of which are herein incorporated by reference.

BACKGROUND OF THE INVENTION

The invention relates to a method for arranging a valve element in an additional control valve device. Valve elements in additional control valve devices are known. The basic method of functioning of additional control valve devices in which valve elements are arranged is described in DE 101 37 828 A1. In the additional control valve devices there is provision for a valve element to be arranged which is of essentially mushroom-shaped design and which is guided in a reversibly movable fashion in a guide in the direction of the longitudinal axis of the additional control valve device. In this valve element, a hat-shaped plate, which is formed first be concave with an apex point in the direction of the side facing away from the inlet ducts, is arranged on a stem of said valve element. This valve element is moved during operation between the gantry magnet and the trapping magnet. In this way, the respectively desired open or closed position of the additional control valve device is set. The stem of the valve element ends at a collar. A first spring is supported between the collar and the bottom of the blind hole in which the stem is guided. The further spring is supported between the collar and the other end of blind hole. In this way, the valve element forms, together with the two springs, a system which is capable of oscillating and which is held in a central position by the springs. The actual frequency of the system which is capable of oscillating is given by spring constants and the weight of the valve element. This ensures that it is possible to change extremely quickly between the open position and the closed position, in each case the gantry magnet and the trapping magnet, between which the valve element is guided in a reversibly movable fashion, each only have to apply the holding force and the kinetic energy is stored in the springs. The additional control valve devices are generally introduced into the inlet ducts of piston-type internal combustion engines. They are used here for pulsed charging of spark ignition and diesel engines. The pulsed charging brings about an increase in the cylinder charge and thus an increase in the torque in the lower and central rotational speed ranges. For optimum configuration of the additional control valve devices it is necessary for the valve plate to assume as precise a central position as possible between the gantry magnet and the trapping magnet in the currentless state of the additional control valve device. At the same time, the distance between the valve plate and the gantry magnet must be equal to the distance between the valve plate and the trapping magnet. The valve plate must thus assume a central position with tight tolerances in the currentless central position between the mechanical stops, in order to ensure functioning of the actuator with the lowest possible force level of the two electromagnets. However, with the known additional control valve devices it is disadvantageous that the optimum central position cannot be set in tight tolerance ranges owing to fabrication tolerances. In this context, a plurality of factors disadvantageously come to bear. On the one hand, the two valve springs have fabrication tolerances. Furthermore, for example general fabrication tolerances are found during the manufacture of the guide for the valve element. This disadvantageously makes impossible to set an optimum central position of the valve element in the currentless state of the additional control valve device even if the relative structural dimensions and configurations of the component which have be to set for such an optimum central position are determined and implemented precisely in terms of engineering. In order to counteract this disadvantage, it is then necessary to carry out relatively complex manual adjustment processes which however cannot be implemented in large scale fabrications since this would generally be too complex.

SUMMARY OF THE INVENTION

The invention is therefore based on the object of providing a method for arranging a valve element in an additional control valve device by means of which the disadvantageous effects of fabrication tolerances can largely be avoided. In addition, it should be suitable for large scale fabrication.

The object on which the invention is based is achieved by means of a method for arranging a valve element in an additional control valve device, in which, in a first step, the inside of the guide for the valve element is provided, at its end facing the trapping magnet, with a spring bearing; in a second step a first valve spring is introduced into the guide at its end facing away from the trapping magnet until it abuts against the spring bearing; the stem of the valve element and a first counter bearing—connected thereto at its end facing away from the trapping magnet—for the first valve spring is introduced into the guide at its end facing away from the trapping magnet in a third step, wherein the stem is guided inside the first valve spring and the first counter bearing is finally releasably held in the guide at a previously determined first position which theoretically permits the central position of the valve element to be set precisely in the currentless state of the additional control valve device; in which, in a fourth step, the valve plate of the valve element is pushed with its centrally arranged, circumferential collar with its concave side onto the stem at its end facing the trapping magnet and is moved into an abutting position by means of the trapping magnet, and the valve plate and stem are then connected to one another; in which, in a fifth step, a second valve spring is introduced into the guide at its end facing away from the trapping magnet until it abuts against the first counter bearing; and in which, in a sixth step, a second counter bearing for the second valve spring is introduced into the guide at its end facing away from the trapping magnet, and is secured in the guide at a previously determined second position which theoretically permits the central position of the valve element to be set precisely in the currentless state of the additional control valve device; and the holding of the first counter bearing in the previously determined first position is finally cancelled in a seventh step. The valve element is constructed in two parts and is composed of the valve plate and the stem. The guide for the valve element is generally of essentially cylindrical and tubular design. The trapping magnet is an annular magnet, signifying the combination of a coil and magnetic yoke. The stem of the valve element is also of tubular design in the form of a sleeve. The first counter bearing is used as an abutment face for the end of the first spring which does not bear against the spring bearing. Said counter bearing is generally in the form of a reference circle, in the widest sense, and generally has, on the inside, a thread for attaching to the stem. The stem is then provided with a corresponding thread and can thus be screwed to the first counter bearing. The second counter bearing is of similar structural design and generally has an external thread on the outside, with which it can be secured in the guide for the valve element, which is then formed as a complementary internal thread. The previously determined first positions and second positions, which each theoretically permit the central position of the valve element to be set precisely in the currentless state of the additional control valve device, are positions which are configured in advance in terms of engineering and which are generally related to a reference surface in the additional control valve device. If there were not fabrication tolerances present, it would be possible, when implementing the previously determined first position and the previously determined second position, to set a precise central position of the valve element or of the valve plate between the gantry magnet and the trapping magnet of the additional control valve device. The first counter bearing is releasably held in the previously determined first position. This is generally carried out, for example, by inserting a tappet into the guide, at its end facing away from the trapping magnet. If this tappet is removed again, which may be provided according to the seventh step of the method, the first counter bearing can be pushed again in the guide in the direction of the longitudinal axis, due to the spring force. It has now become surprisingly apparent that the influence of fabrication tolerances, which has a disadvantageous effect on the setting of the central position of the valve element in the currentless state of the additional control valve device, is virtually entirely avoided. This is achieved essentially by virtue of the fact that the fabrication tolerances which arise during the manufacture of the first valve spring and during the manufacture of the guide for the valve element are compensated virtually completely. When the first position for the first counter bearing is determined, a configuration is implemented taking into account the spring characteristic values of the first valve spring and of the second valve spring, in such a way that an optimum central position of the valve plate is set starting from the position of the valve plate in which it abuts against the trapping magnet, after the end of the seventh step of the method. If, for example, the valve plate were fixedly connected to the stem before the first position were implemented, it would not be possible for the valve plate to abut tightly against the stop of the trapping magnet after the first position has been set, owing to the fabrication tolerances. Due to the fabrication tolerances of, for example, the first valve spring, there would then be an undesired gap between the valve plate and the trapping magnet, which gap alone would prevent an optimum central position from being set. However, in contrast to this, the method according to the invention provides that, after the first position has been set, which theoretically permits the central position of the valve element to be set precisely in the currentless state of the additional control valve device, the valve plate is pushed on to the stem until the valve plate makes contact with the stop of the trapping magnet. Only then is the valve plate connected to the stem, which can be effected, for example, by bonding. This ensures that the fabrication tolerances are completely compensated by virtue of the first valve spring and the guiding of the valve element. With the arrangement of the valve element in the additional control valve device, only those fabrication tolerances which are brought about by the second valve spring and, if appropriate, by the second counter bearing, then act. However, these tolerances are negligibly small and no longer have a disadvantageous effect on the setting of a precise central position of the valve element in the currentless state of the additional control valve device. After the second counter bearing has been secured in the guide, the holding of the first counter bearing in the previously determined first position is cancelled, which is then generally carried out by removing the tappet from the guide. After this has been done, the valve element automatically assumes a virtually precisely central position between the gantry magnet and the trapping magnet in the currentless state of the additional control valve device owing to the spring forces which then act. It is particularly advantageous in this context that it is possible to dispense with complex adjustment procedures so that the method can also be used particularly advantageously in large scale fabrication.

According to one preferred configuration of the invention there is provision that in the third step the stem and the first counter bearing are introduced as individual parts into the guide. This permits the method to be carried out more efficiently.

According to a further preferred configuration of the invention there is provision for the valve plate and stem to be connected by welding. This can be carried out particularly advantageously in large scale fabrication, in which case it is possible to set a relatively fixed connection between the valve plate and the stem at the same time, which is particularly advantageous for relatively long operating times of the additional control valve device.

BRIEF SUMMARY OF THE SEVERAL VIEWS OF THE DRAWINGS

The invention will be explained in more detail below by way of example with reference to the drawing (FIG. 1 to FIG. 7):

FIG. 7 shows a longitudinal section through parts of an additional control valve device according to the prior art.

DETAILED DESCRIPTION OF THE INVENTION

Figure 1:
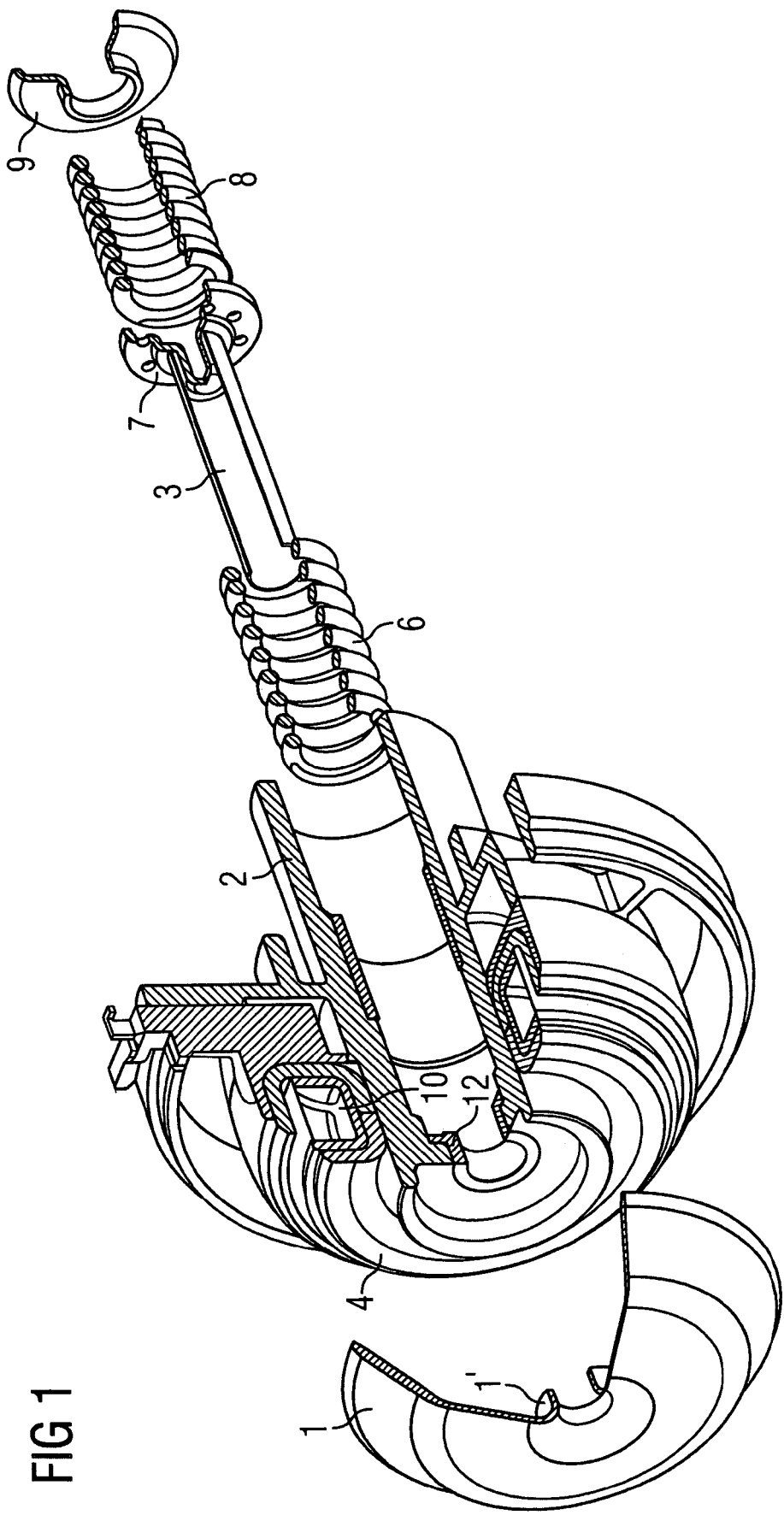
FIG. 1 shows parts of the additional control valve device three-dimensionally in the form of an exploded drawing.

FIG. 1 illustrates parts of the additional control valve device three-dimensionally in the form of an exploded drawing. The valve plate 1 has a centrally arranged circumferential collar 1' which is formed virtually in the shape of a funnel. The spring bearing 12 is arranged in the guide 2 for the valve element at its end facing away from the trapping magnet 10. The trapping magnet 10 has a stop 4 for the valve plate 1.

A first valve spring 6 is provided into which the stem 3 of the valve element can be introduced. At its end, facing away from the trapping magnet 10 of the stem 3, a first counter bearing 7 for the first valve spring 6 is arranged. In addition, a second valve spring 8 is provided which is positioned between the first counter bearing 7 and second counter bearing 9.

Figure 2:
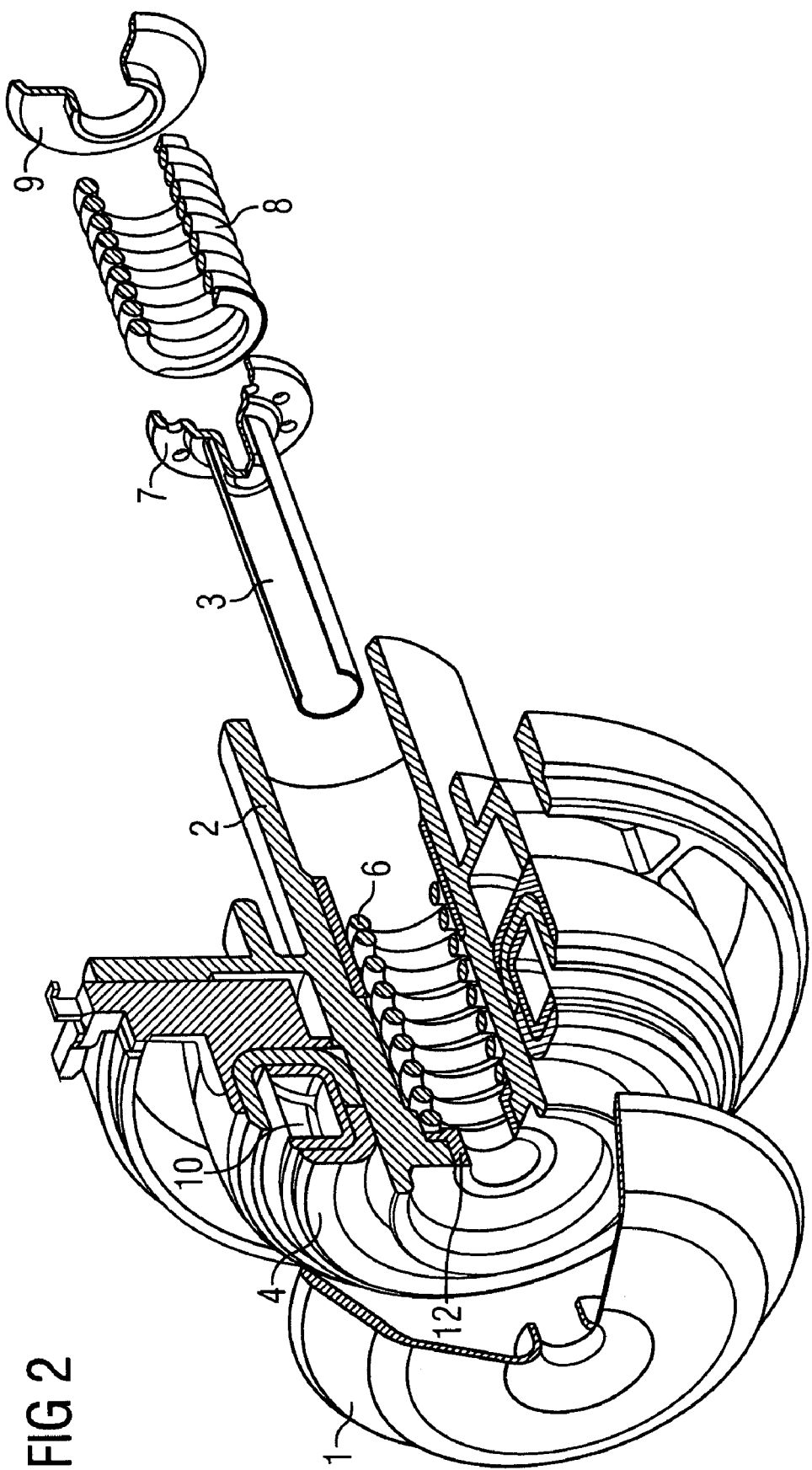
FIG. 2 shows parts of the additional control valve device three-dimensionally after the second step of the method has ended.

FIG. 2 illustrates parts of the additional control valve device three-dimensionally after the second step of the method has ended. According to the method for arranging a valve element in an additional control valve device, in a first step a spring bearing 12 is arranged in the inside of the guide 2 for the valve element at its end facing the trapping magnet 10. Depending on the material of the spring bearing 12 and the guide 2, the spring bearing 12 and the guide 2 can also be composed on the individual part. In a second step, a first valve spring 6 is introduced into the guide 2 at its end facing away from the trapping magnet 10, until it abuts against the spring bearing 12. The first valve spring 6 is a compression spring.

Figure 3:
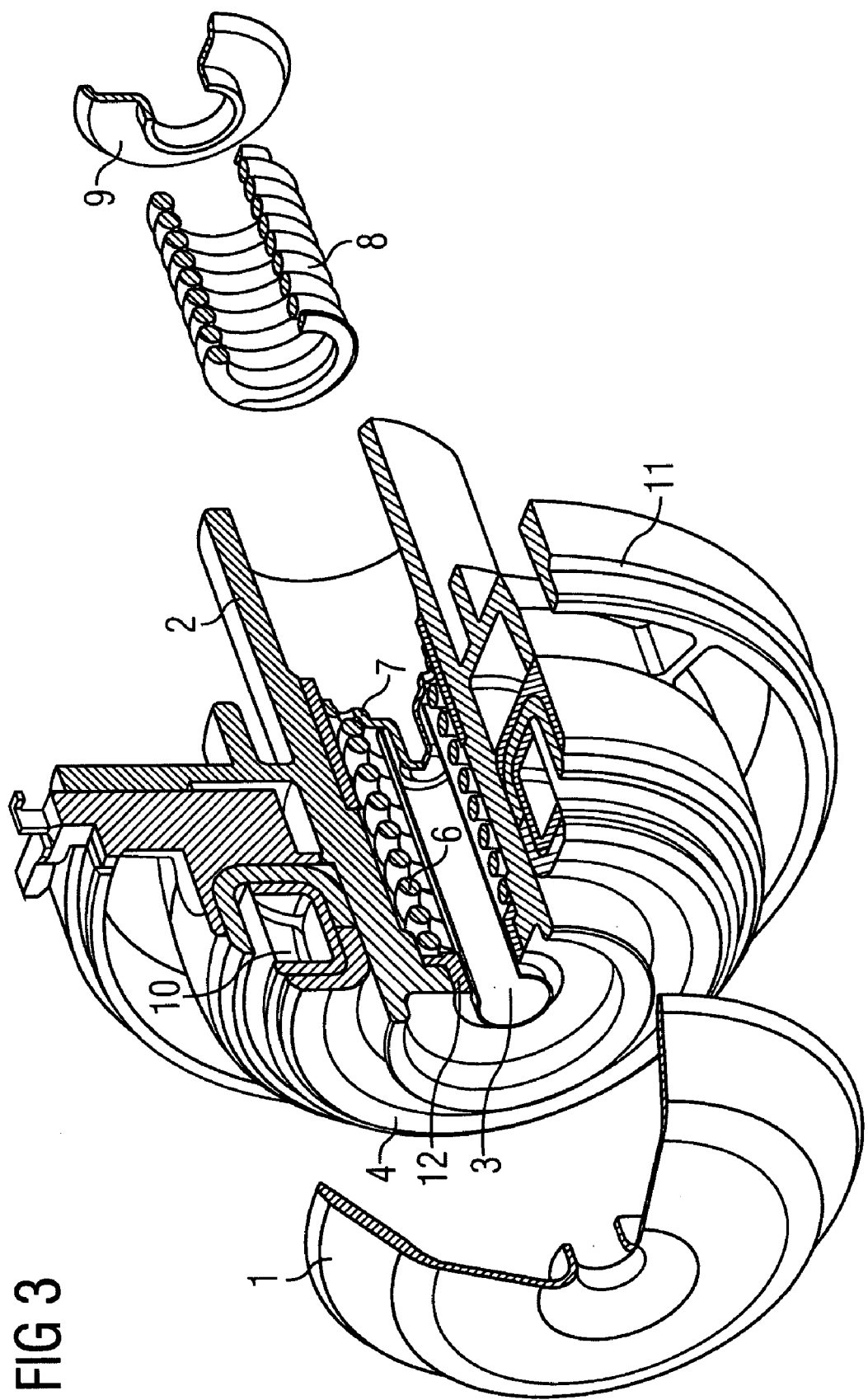
FIG. 3 shows parts of the additional control device three-dimensionally after the third step of the method has ended.

FIG. 3 illustrates parts of the additional control valve device three-dimensionally at the end of the fourth step of the method. Starting from the arrangement illustrated in FIG. 2, the stem 3 of the valve element and a first counter bearing 7—connected thereto at its end facing away from the trapping magnet 10—for the first valve spring 6 was introduced in a third step into the guide 2 at its end facing away from the trapping magnet 10. In the process, the stem 3 is guided inside the first valve spring 6, and the first counter bearing 7 is finally releasably held in the guide 2 at a previously determined first position, which theoretically permits the central position of the valve element to be set precisely in the currentless state of the additional control valve device. This holding is carried out, for example, by centrally inserting a tappet (not illustrated) which firstly holds it in position. The determination, in terms of engineering, of this first position and later also of a second position is carried out here in relation to the reference surface 11. However, it is also possible to select other surfaces as the reference surface 11. The optimum theoretical spring length of the first valve spring 6 is set by implementing the previously determined first position.

Figure 4:
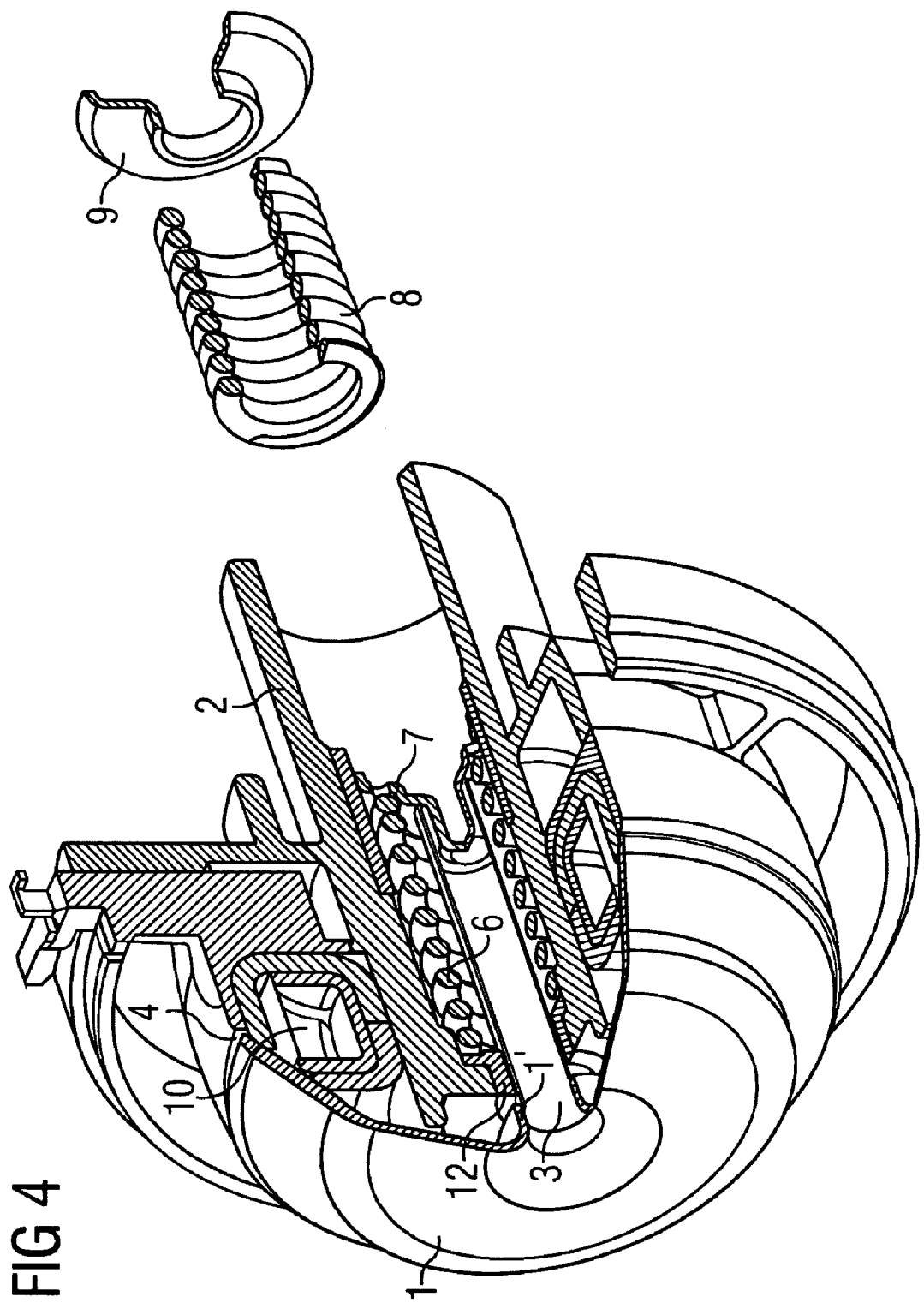
FIG. 4 shows parts of the additional control device three-dimensionally after the fourth step of the method has ended.

In FIG. 4, parts of the additional control valve device are illustrated three-dimensionally after the fourth step has ended. Starting from the arrangement illustrated in FIG. 3, in a fourth step of the method the valve plate 1 of the valve element is pushed with its centrally arranged circumferential collar 1' with its concave side onto the stem 3 and moved into an abutting position by means of the trapping magnet 10 against the stop 4. The collar 1' is formed in a funnel shape here and has an internal diameter which is somewhat larger than the external diameter of the stem 3. As soon as the valve plate 1 abuts against the stop 4 of the trapping magnet 10, the valve plate 1 and stem 3 are then connected to one another. Welding is particularly preferred here as the connecting method. This ensures that when the first position of the counter bearing 7 is set, at the same time the valve plate 1 is made to abut against the stop 4 of the trapping magnet. Fabrication tolerances of parts of the additional control valve device which have been installed up to now are thus completely compensated up to the end of the fourth step of the method, which ultimately permits a virtually optimized central position of the valve plate 1 to be set in a particularly easy and advantageous way in the currentless state of the additional control valve device.

Figure 5:
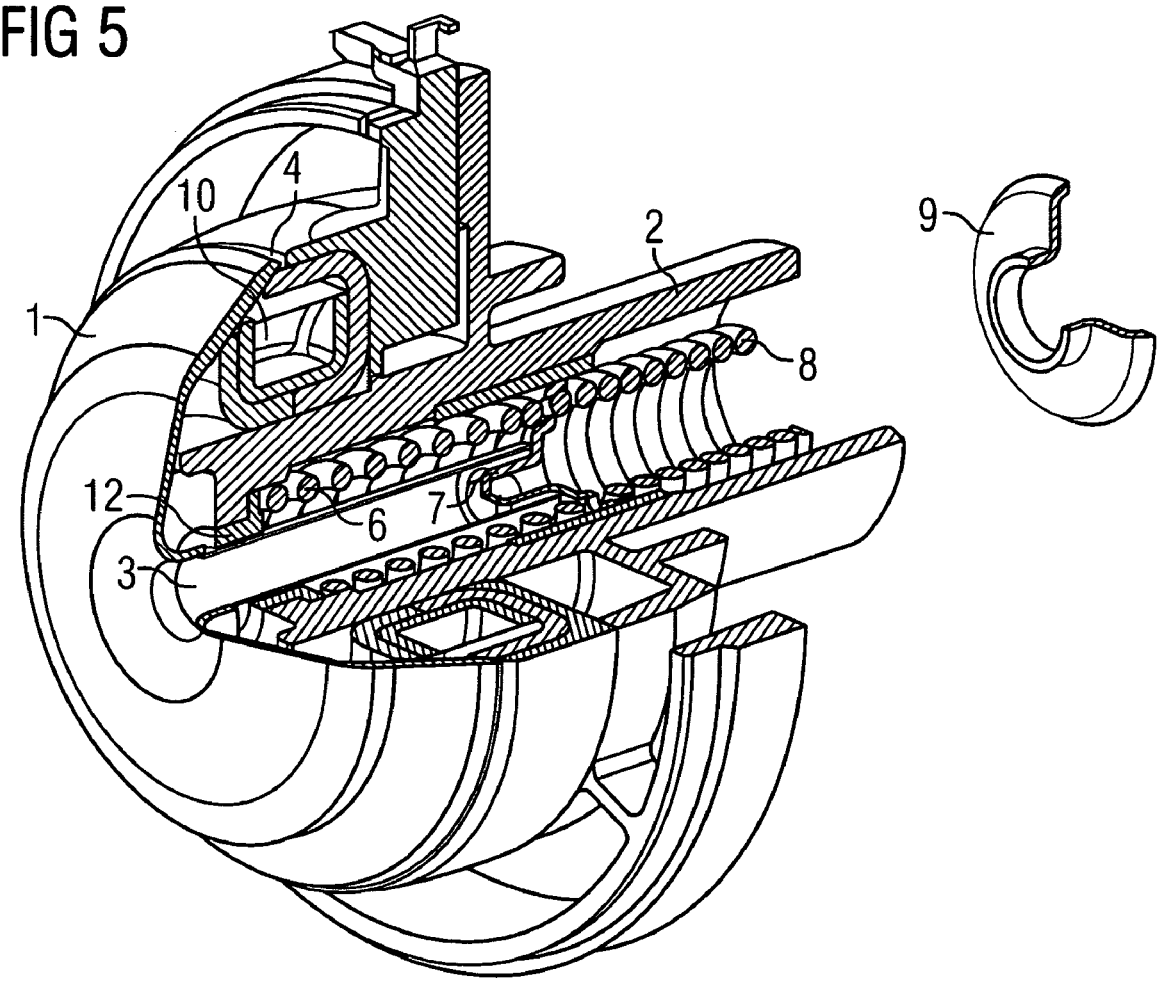
FIG. 5 shows parts of the additional control valve device three-dimensionally after the fifth step of the method has ended.

FIG. 5 illustrates parts of the additional control valve device three-dimensionally after the end of the fifth step of the method. Starting from the position illustrated in FIG. 4, in a fifth step a second valve spring 8, which is also a compression spring, is introduced into the guide 2 at its end facing away from the trapping magnet 10, until it abuts against the first counter bearing 7.

Figure 6:
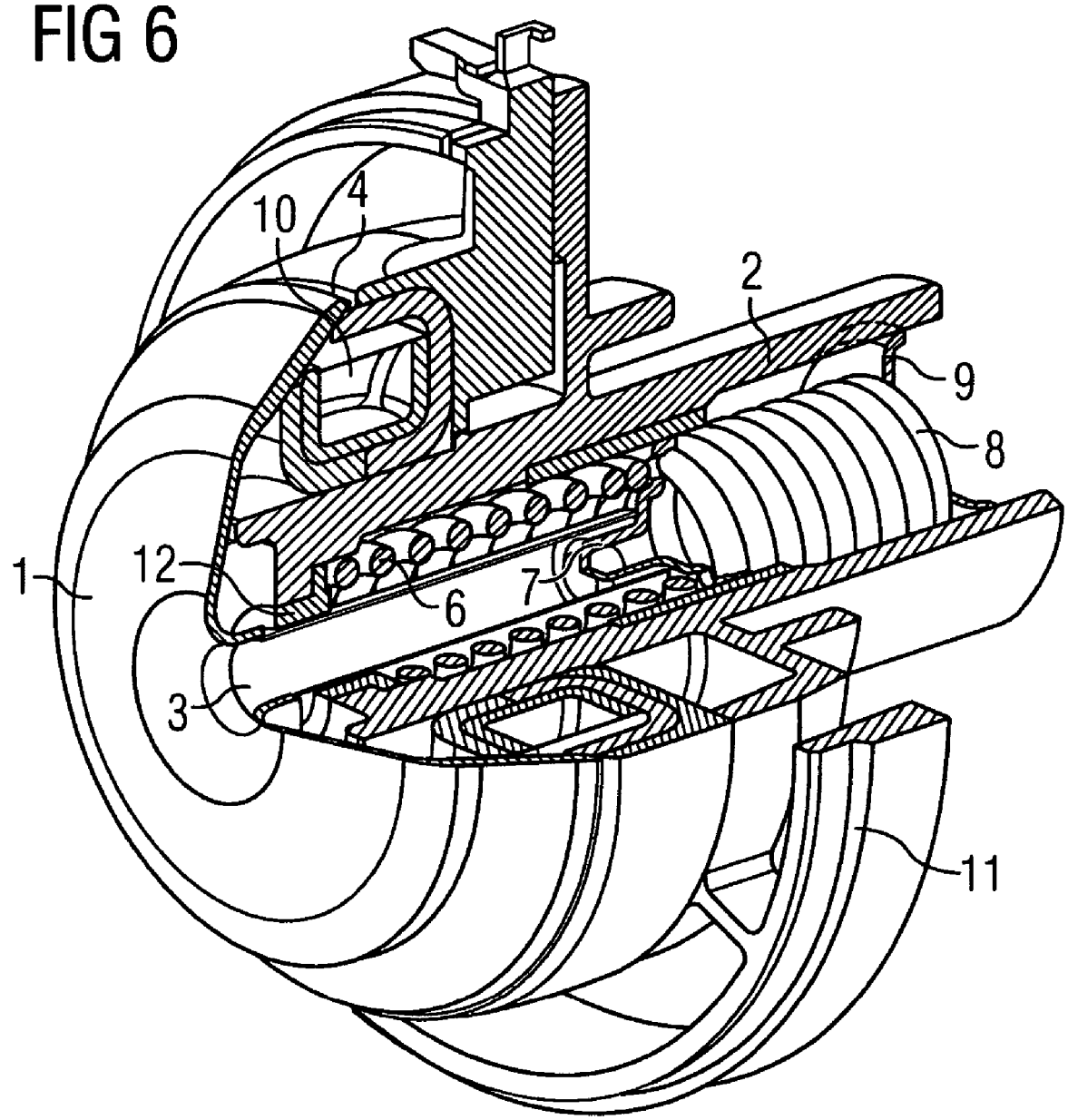
FIG. 6 shows parts of the additional control valve device three-dimensionally after the sixth step of the method has ended.

FIG. 6 illustrates parts of the additional control valve device three-dimensionally after the end of the sixth step of the method. Starting from the position illustrated in FIG. 5, in a sixth step a second counter bearing 9 for the second valve spring 8 is introduced into the guide 2 at its end facing away from the trapping magnet 10, and is secured in the guide 2 at a previously determined second position, which theoretically permits the central position of the valve element to be set precisely in the currentless state of the additional control valve device. The actual securing can be carried out here, for example, by means of an external thread (not illustrated) of the second counter bearing 9 and an internal thread (not illustrated) of the guide 2 which is formed so as to be complementary to the latter. After the securing process, the second counter bearing 9 can thus no longer be pushed in a reversible fashion in the guide 2 in the direction of the longitudinal axis. The position illustrated in FIG. 6 is finally followed by a seventh step (not illustrated) in which the holding of the first counter bearing 7 in the previously determined first position is cancelled. This is done, for example, by removing the tappet. Owing to the forces of the first valve spring 6 and of the second valve spring 8 which act then, the valve element which is composed of valve plate 1 and the valve stem 3 then moves automatically into virtually optimum central position between the gantry magnet (not illustrated) and the trapping magnet 10. The fabrication tolerances of the second valve spring 8 and the second counter bearing 9 which still have an effect are negligibly small in this context so that in practice it is possible to speak of the setting of a virtually optimum central position.

FIG. 7 illustrates the longitudinal section through parts of an additional control valve device according to the prior art in a simplified and schematic form. The valve element 1' is composed here of an individual part, formed from a valve plate and valve stem. In order to set the desired central position M, the following steps according to the prior art are carried out. First, the spring bearing 12 is inserted into the guide 2. Then, the first valve spring 6 is inserted. After this has been done, the valve element 1' is inserted into the guide 2 from its side facing the trapping magnet 10 until contact is made with the stop 4 of the trapping magnet 10. The first counter bearing 7 is then inserted into the guide 2, by the end of the guide 2 facing away from the trapping magnet 10, and connected to the valve element 1'. After this, the second valve spring 8 and the second counter bearing 9 are inserted into the guide 2 and finally the second counter bearing 9 is secured at a previously determined second position, which theoretically permits the central position of the valve element to be set precisely in the currentless state of the additional control valve device. If there were no fabrication tolerances present, the valve element 1' would then be moved precisely into the central position M. Owing to fabrication tolerances this is however not possible, for which reason it is generally necessary to attempt to set the desired optimum central position M manually by adjusting the second counter bearing 9. If the second counter bearing 9 has an external thread and the guide 2 has a complementary internal thread, the counter bearing 9 has to be screwed further in to the guide 2 or screwed out of it. This is relatively time-consuming and is thus not suitable for large scale fabrication. According to the inventive method, it is advantageously possible to dispense with manual adjustment, which permits particularly advantageous large scale fabrication.

The invention claimed is:

1. A method for arranging a valve element in an additional control valve device, comprising:
    providing an inside of a guide for a valve element at an end facing a trapping magnet with a spring bearing;
    introducing a first valve spring into the guide at its end facing away from the trapping magnet until it abuts against the spring bearing;
    introducing a stem of the valve element and a first counter bearing, which is connected thereto at an end facing away from the trapping magnet, for the first valve spring into the guide at its end facing away from the trapping magnet, wherein the stem is guided inside the first valve spring and the first counter bearing is releasably held in the guide at a predetermined first position which permits a central position of the valve element to be set in a currentless state of the additional control valve device;
    pushing a valve plate of the valve element with a centrally arranged, circumferential collar with a concave side onto the stem at an end facing the trapping magnet;
    moving the valve plate into an abutting position by means of the trapping magnet;
    connecting the valve plate and the stem;
    introducing a second valve spring into the guide at an end facing away from the trapping magnet until it abuts against the first counter bearing;
    introducing a second counter bearing for the second valve spring into the guide at its end facing away from the trapping magnet;
    securing the second counter bearing in the guide at a predetermined second position which permits a central position of the valve element to be set in the currentless state of the additional control valve device; and
    cancelling the holding of the first counter bearing in the predetermined first position.

2. The method of claim 1, further comprising introducing the stem and the first counter bearing as individual parts into the guide.

3. The method of claim 1, wherein the valve plate and the stem are connected by welding.

4. The method of claim 2, wherein the valve plate and the stem are connected by welding.

* * * * *